United States Patent
Wille et al.

(10) Patent No.: US 8,721,143 B2
(45) Date of Patent: May 13, 2014

(54) ACTUATOR

(75) Inventors: Reinhard Wille, Bonen (DE); Hendrik Rickmeyer, Lette (DE)

(73) Assignee: Hella KGaA, Lippstadt (DE)

( * ) Notice: Subject to any disclaimer, the term of this patent is extended or adjusted under 35 U.S.C. 154(b) by 217 days.

(21) Appl. No.: 13/287,560

(22) Filed: Nov. 2, 2011

(65) Prior Publication Data

US 2012/0044709 A1     Feb. 23, 2012

(30) Foreign Application Priority Data

Mar. 11, 2010   (DE) .......................... 1020100503991

(51) Int. Cl.
*F21V 21/14*   (2006.01)
*F21V 21/15*   (2006.01)

(52) U.S. Cl.
USPC ............................. 362/524; 362/467; 362/515

(58) Field of Classification Search
USPC .................. 362/464–468, 512–515, 523–532
See application file for complete search history.

(56) References Cited

U.S. PATENT DOCUMENTS

| | | | |
|---|---|---|---|
| 2002/0001199 A1* | 1/2002 | Dinant | 362/514 |
| 2009/0168444 A1* | 7/2009 | Hsu et al. | 362/508 |

* cited by examiner

*Primary Examiner* — Karabi Guharay
*Assistant Examiner* — Nathaniel Lee
(74) *Attorney, Agent, or Firm* — Husch Blackwell LLP; Robert C. Haldiman; H. Frederick Rusche

(57) ABSTRACT

The invention relates to an actuator (1), having a motor (2) and an actuator component (3) operable by the motor (2), having a movable gear component (4) with a limit stop component (5a, 5b), and at least one limit stop element (6) with a reference plane serving as stop for the limit stop component (5a, 5b) of the gear component (4), wherein at least one limit stop element (6) and/or the first and/or the second limit stop component (5a, 5b) is/are made from a high-temperature plastic material. Furthermore, the invention of such an actuator (1) relates to the use of such an actuator for the headlamp leveling of a headlamp.

3 Claims, 1 Drawing Sheet

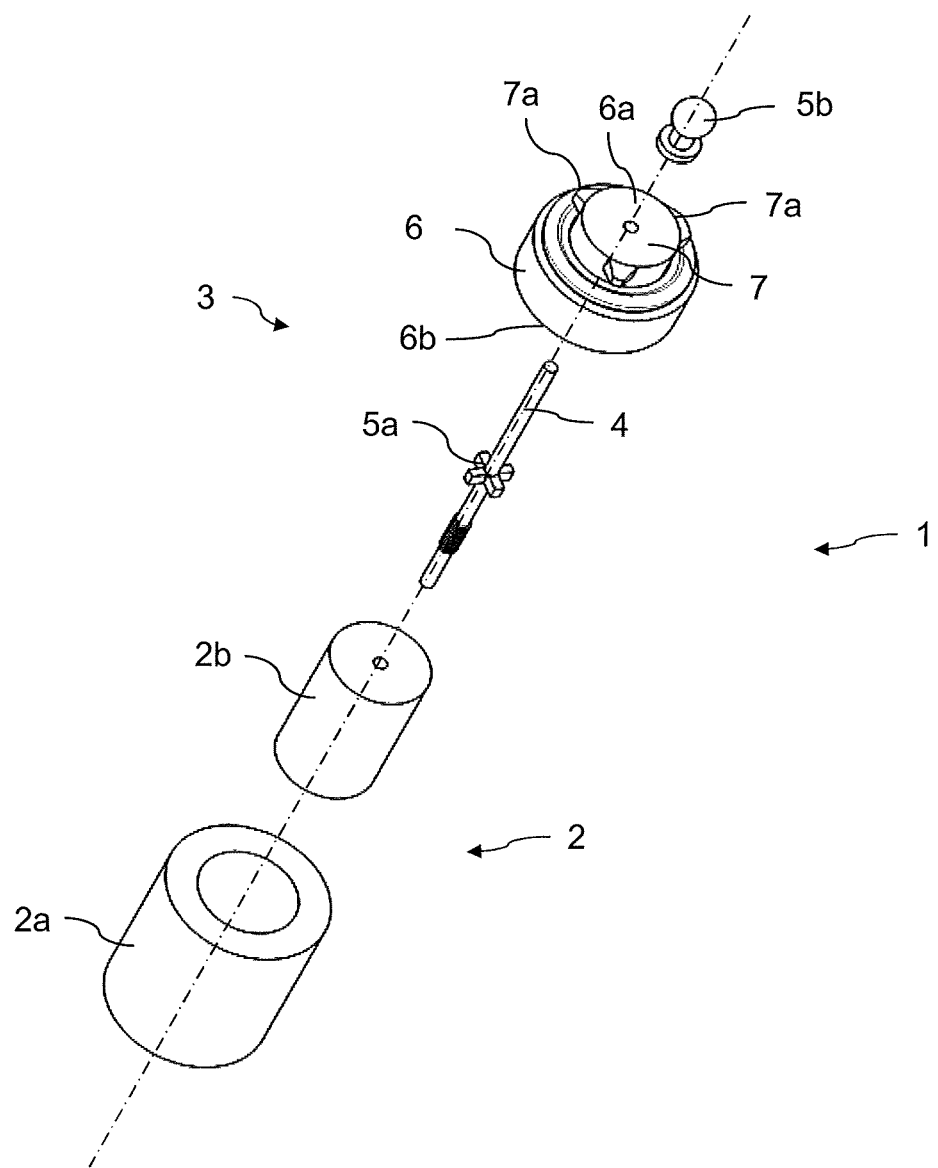

ACTUATOR

This application claims priority and benefit of German Patent Application No. 102010050399.1, filed on Nov. 3, 2010, all of which is incorporated herein by reference.

BACKGROUND OF INVENTION

The present invention relates to an actuator, having a motor and an actuator component operable by the motor, having a movable gear component with at least one first and one second limit stop component, and at least one limit stop element with an inner and an outer reference plane, serving as limit stop of the limit stop component of the gear component. Furthermore, the invention relates to the use of an actuator for the headlamp leveling of a headlamp.

The increasing demand for more operating comfort and more safety lead to the development of more and more intelligent and therefore more complex systems. In an automobile, these systems are for example climate control, breaking and locking systems but also headlamp systems. Reliable actuators are required for the execution of the functions of the respective systems. In the course of time the demands on actuators have risen considerably. The functions of the actuators are becoming more complex, the demands on the reliability of the actuators are increasing and the function of the actuators must be guaranteed of an ever extending product life. The respective actuators are usually high-performance designs adapted to a special place of installation, i.e. to special systems. Electromechanical and electronic components are integrated in intelligent actuators.

Typical fields of application for such actuators are e.g. locking/unlocking, remote control for tank caps, tail gates, storage compartments or headlamp leveling. Safe driving in the dark is only possible with headlamps whose angle of inclination is always correctly adjusted. Only then is the road optimally illuminated and the oncoming traffic is not dazzled. With the manual headlamp leveling customary in today's motor vehicles the driver has the possibility to adapt the inclination of the headlamp to the current load condition by means of a switch on the dashboard. Modern headlamp leveling systems automatically adapt the angle of inclination of the headlamp to that of the vehicle body without any involvement of the driver. Here a differentiation is often made between two systems. Static headlamp leveling corrects changes in the angle of inclination on the basis of load conditions of the motor vehicle. In addition to that, dynamic headlamp leveling also reacts to changes in the angle of inclination caused by braking and acceleration of the motor vehicle.

Systems with special headlamp leveling power lighting modules, such as e.g. AFS systems (AFS=adaptive front lighting system), represent a photometric innovation in which the light distribution is adapted to the driving situation, i.e. for driving in the city, on country roads or on motorways in addition to adjusting the light beam to the course of the road.

The actuators required for this purpose execute instructions calculated by a control unit. This means that the actuators transform electric signals from the control unit into physical variables.

Future light-based driver assistance systems (LBAS) will require a high degree of positioning accuracy of the lighting function over the entire temperature range. Current actuators are made from a thermoplastic material, such as e.g. PBT. This means, a substantial part of the component parts of such actuators is made from thermoplastic material, such as PBT. Actuators are, however, sometimes exposed to extreme thermal conditions, in a motor vehicle, for example. Temperature changes ranging from −40° C. to more than +120° C. are possible in automotive headlamps. Furthermore, the requirements relating to thermal resistance of headlamps and therefore also of the actuators connected with the headlamps, for example 4 h at 120° C., are very high. These temperature changes and high thermal resistance requirements lead to variations in the material expansion of the components of a system, such as a headlamp system. For a headlamp leveling actuator of a headlamp system this means that reference planes of the actuator are lost for safe and dazzle-free operation due to poor thermal stability of the thermoplastic material of the actuator, caused for example by a large coefficient of thermal expansion. As misadjustment of a headlamp during driving must be avoided at all cost because of the danger of dazzling the oncoming traffic, the actuators are referenced again with every start of operation. This shall ensure the exact positioning of the actuator and therefore of the actuator component of the actuator in the headlamp. A headlamp leveling actuator, and particularly a part of the actuator component of the actuator can, depending on the installation position in the headlamp, drive into a number of different limit stop components of the actuator, e.g. a housing cover, for the execution of the referencing process. After the start of the referencing process, the actuator component of the actuator runs hard against the respective limit stop component with an excess number of steps.

A disadvantage of the currently known actuators is that the involved plastic parts do not meet the exacting requirements with regard to temperature resistance and accuracy. Plastic deformation leads to a loss in accuracy of the actuator.

SUMMARY OF THE INVENTION

The task of the present invention is therefore to develop an actuator in which the disadvantages described above are avoided. In particular, an actuator shall be developed, in which the position of the limit stop for the execution of the referencing process remains stable also at high temperatures.

According to the invention, this task is solved by an actuator with the characteristics according to the independent patent claim 1 and the use of an actuator according to patent claim 11. Further characteristics and details of the invention result from the sub-claims, the drawing and the description. Characteristics and details described in connection with the actuator do therefore naturally also apply in connection with the use of such an actuator, and vice versa, so that with regard to the enclosure, reciprocal reference is always made or can be made to the individual aspects of the invention.

According to a first aspect of the invention, the task is solved by an actuator having a motor and an actuator component being operable by the motor and having a movable gear component with a first and a second limit stop component, and a limit stop element with an inner and an outer reference plane serving as a limit stop for the limit stop component of the gear component, the limit stop element and/or the first and/or the second limit stop component being made from a high-temperature plastic material. As the limit stop element and/or the first and/or the second limit stop component is/are made from a high-temperature plastic material, the actuator is highly temperature-resistant. By using a high-temperature plastic material for the limit stop element and/or the first and/or the second limit stop component of the actuator, the latter has low thermal elongation and high strength. This ensures the minimization of the "behavior under thermal influence", this means a low material expansion of the actuator, and especially of the limit stop element.

The limit stop element made from high-temperature plastic material and/or the first and/or second limit stop components made from high-temperature plastic material have a resistant and particularly a temperature-resistant design and can therefore permanently ensure the referencing and positioning processes of the actuator and especially of the actuator component of the actuator, even under high temperature load. This means that the use of a high-temperature plastic material for the limit stop element and/or the first and/or the second limit stop component of the actuator leads to the minimization of "thermal breathing" of the actuator component or rather to a thermal stabilization of the limit stop element for the referencing process.

The movable gear component of the actuator component may have different designs. The movable gear component depends in particular from the type of motor of the actuator. The gear component may for example comprise a multitude of toothed wheels and a movable plunger. According to a preferred further development of the invention it may be planned for the actuator, that the movable gear component is a drive rod led in a linear manner through the motor. By means of the drive rod, the movement of the motor can be transformed into a linear actuation movement. For the execution of a referencing process, the first or the second limit stop component runs several times into the limit stop element having an inner and an outer reference plane. This means that the limit stop element and the reference planes of the limit stop element respectively serve as a reference for all further actions of the actuator. If a definite number of steps in the opposite direction is given, the geometric position of a respective component of the actuator, respectively the position of a system coupled with the actuator, for example a headlamp, can be deduced by counting of the step sequence. The drive rod guided in a linear manner can be guided through an opening in a housing part, and particularly an opening in a housing cover, of the actuator, to determine by this means a geometric position of a component of the actuator, for example a ball head of the actuator.

According to a particularly preferred further development of the invention it may be planned for the actuator, that the limit stop element is a housing part of the actuator, especially a housing cover of the actuator, that the first limit stop component is a stop element radially arranged on the movable gear component, wherein the gear component is guided in the housing part, and/or that the second limit stop component is a ball head of the gear component. Preferably, the gear component is a drive rod. The gear component, respectively the drive rod is preferably lead through an opening in the housing part, and particularly in the housing cover. Herein, the stop element is arranged radially on the gear component, and particularly on the drive rod, in such a manner that with a linear movement of the gear component or the drive rod respectively, and a specific position of the gear component or the drive rod respectively relative to the housing part of the actuator, the stop element drives against the housing part of the actuator and particularly against the outer reference plane of the housing part. This means that the referencing process of the actuator can be executed by driving the stop element radially arranged on the limit stop element against the housing part. The housing part, and particularly the housing cover, of the actuator does therefore have an outer reference plane serving as the limit stop of the stop element of the gear component, and particularly of the drive rod. The stop element may be a disc, a cross, a protrusion, a pin etc.

Alternatively, or in addition to the further development of the actuator described above, it can be planned on the actuator according to the invention, that the second limit stop component is a ball head. The gear component, and particularly the drive rod, is led though the housing part, and particularly a housing cover, of the actuator, so that the ball head arranged at the end of the gear component, and particularly the drive rod, can drive against the housing part, and particularly the housing cover, of the actuator. In this variant the other side of the housing part, and particularly of the housing cover, serves as inner reference plane for the limit stop of the ball head. This means that the ball head represents a second stop element for the limit stop on the inner reference plane. The ball head is made from a high-temperature plastic material, so that no temperature-related plastic deformation occurs when the housing part is driven against the housing part.

According to a further preferred further development of the invention it may be planned for the actuator, that a bayonet interface is arranged on the actuator, and particularly on a housing part of the actuator, for the coupling of the actuator with a component to be actuated by the actuator component, the bayonet interface being made from a high-temperature plastic material. Thus, the actuator may be coupled with a respective system, for example with a housing of a headlamp, by means of the bayonet interface. Preferably, an o-ring being preloaded with approx. 200 Newton by the bayonet coupling process between the actuator, and particularly the housing part, e.g. the housing cover and the bayonet reception, serves as safety device. Due to the fact that the bayonet interface is made from a high-temperature plastic material, the bayonet interface remains stable and is deformed at most very slightly even when exposed to high temperatures. As also the bayonet interface is made from a high-temperature plastic material, variations in the material expansion of the bayonet interface is minimized.

An actuator designed as described above fulfils very high demands on accuracy and temperature resistance. Due to the fact that various components of the actuator, for example the limit stop element, which may be embodied as a housing, and the bayonet interface for the arrangement of the actuator on a respective system and the ball head are made from a high-temperature plastic material, an increased temperature resistance and stability of the entire actuator is given. Furthermore the reference position, i.e. the reference plane is stabilized in an actuator with such a design.

Particularly preferred is an actuator in which the motor is a stepper motor having at least one stator and one rotatable rotor and being coupled with the movable gear component, in particular the drive rod, that by means of a rotating movement of the rotor the gear component, in particular the drive rod, can execute a linear movement. In a particularly preferred embodiment the motor, which may also be called stepper motor, has two stator windings which may be cyclically supplied with current by an electric driver. By this means a leaping rotating magnetic field is generated, which the rotor follows in steps. By means of this movable gear component, in particular the movable drive rod, the rotating movement of the rotor is transformed into a linear actuation movement. To avoid a misadjustment of the system coupled with the actuator, and particularly of a headlamp, the stepper motor is referenced again with each starting of the system, in particular of the motor vehicle. This ensures the exact positioning of the actuator, or rather of the actuator component in the connected system. In case of a headlamp the referencing ensures the exact positioning of the actuator, or rather of the actuator component in the headlamp and therefore the required freedom from dazzlement of the traffic.

According to a particularly preferred further development of the invention it may be planned for the actuator, that the high-temperature plastic material is a highly crystalline, thermoplastic material with good mechanical, thermal and electric properties. Furthermore, it is preferred, that such a high-temperature plastic material displays excellent chemical resistance. Polyvinylidene fluoride, polytetrafluoroethylene, polyetheretherketone may for example be used as such a high-crystalline, thermoplastic material. Such high-temperature resistant plastic materials do also feature good hydrolysis resistance, high corrosion resistance and good weatherability. Furthermore, such high-temperature plastic materials are hardly wettable with liquids and not inflammable, serve as electric insulators, and this over a very wide temperature range. Advantageously the high-temperature plastic material of the limit stop element, and particularly of the housing cover, of the ball head and/or of the bayonet interface is highly dimensionally stable to heat, rigid and stable and is highly resistant to chemicals.

According to a particularly preferred further development of the invention and particularly with regard to industrialization (high production volumes, low costs) it may be planned for the actuator, that the high-temperature plastic material of the limit stop element and/or of the bayonet interface and/or the first and the second limit stop component and/or a further component of the actuator each feature a Young's modulus of 17500 N/mm$^2$ min, a stress at break of 220 N/mm$^2$ min., an elongation at break of 2 N/mm$^2$ min., an impact strength of at least 80 kJ/m$^2$ min. and an impact value (Izod-test) of 80 kJ/m$^2$ min. A high-temperature plastic material with such mechanic properties increases the stability of the actuator, and particularly of the actuator component, and leads to the stabilization of the reference plane, respectively the referencing position. If the actuator is designed for the headlamp leveling of the headlamp system, the actuator and particularly the ball head as the coupling element to the headlamp module has only little influence on the position of the cut-off line.

Preferred is furthermore an actuator in which the high-temperature plastic material of the, at least one, limit stop element and/or the bayonet interface and/or the first and the second limit stop element and/or a further component of the actuator has a melting temperature of at least 325° C. and a longitudinal coefficient of elongation of less than 0.15 times 10-4/K at a temperature between 23° C. and 55° C. and a lateral coefficient of elongation of less than 0.4 times 10-4/K at a temperature between 23° C. and 55° C. A high-temperature plastic material with such thermal properties is particularly suitable as material for the limit stop element and/or the bayonet interface and/or the limit stop component, such as the stop element and the ball head, of the actuator. Because of such a high-temperature plastic material, the thermal influence of the actuator on the position of the cut-off line is minimized in an actuator designed for headlamp leveling.

Viewed from a general point of view, the application of such high-temperature plastic materials in actuators, or their individual components respectively, has the following effect:

a. A low thermal longitudinal coefficient of elongation and a high rigidity of the components of the actuator and the ensuing minimization of the "behavior under thermal influence" of the actuator, and especially of the actuator component of the actuator.

b. A stable and particularly a thermally stable housing geometry of the actuator to ensure actuator-internal referencing and positioning processes.

For example the material expansion under thermal influence is minimized by means of bayonet coupling of the actuator. Furthermore, the "thermal breathing" of the actuator, and particularly of the actuator component of the actuator, is minimized. Also, the use of such a high-temperature plastic material can generate a thermal stabilization of the limit stop element, or of the reference planes of the, at least one, limit stop element respectively, for the referencing process.

According to a further preferred further development of the invention it may be planned for the actuator, that the high-temperature plastic material of the limit stop element and/or the bayonet interface and/or the first and the second limit stop component and/or further components of the actuator is deformation resistant at temperatures over 250° C. and long-term deformation resistant at temperatures over 150° C. Therefore the full function of the actuator can be maintained even over an extended period of time and at high thermal loads. An actuator with such properties allows ensuring the high thermal stability of the actuators during their application. Particularly the application of such high-temperature plastic materials for key components of the actuator component and the limit stop element, and particularly the reference planes, ensures high thermal stability.

According to a particularly preferred further development of the invention, the actuator is designed for the headlamp leveling of the headlamp, and particularly of a headlamp for a motor vehicle. The use of an actuator for headlamp leveling of a headlamp, and particularly of a headlamp for a motor vehicle, as described above, minimizes the thermal influence of the actuator on the position of the cut-off line of the headlamp. Such actuators allow a high degree of positioning accuracy of the light function over the entire temperature range of the headlamp. The use of such an actuator has turned out to be particularly favorable for the headlamp leveling of a Bi-Xenon or AFS headlamp system, as thermal dependencies of the headlamp components, and especially of the actuators, become particularly apparent because to the vertical movement of the cut-off line. By means of an actuator of this kind, the exact positioning of the actuator, or rather the actuator component of the actuator, in the headlamp system is ensured and therefore the required freedom from dazzlement of the traffic. Temperature changes in the range from −40° C. to 120° C. in the headlamp and high thermal resistance requirements on the headlamp components lead to variations in the material expansion of all involved components of the headlamp system and therefore also the actuator. Due to the very high thermal stability of the limit stop element, and in particular of the housing cover, or the ball head or the stop element of the actuator, the reference plane for safe and dazzle-free operation of the headlamp system is not lost. The use of such an actuator does also not lead to variations in the material expansion with considerable effects on the cut-off line image on a wall at 10 m distance. Because of the high-temperature plastic material, the bayonet interface of the actuator is not thermally deformed despite the fact that the bayonet interface, and particularly the bayonet hooks of the bayonet interface, are subject to an important pre-load.

Further areas of applicability of the present invention will become apparent from the detailed description provided hereinafter. It should be understood that the detailed description and specific examples, while indicating the preferred embodiment of the invention, are intended for purposes of illustration only and are not intended to limit scope of the invention.

BRIEF DESCRIPTION OF THE DRAWINGS

Further advantages, characteristics and details of the invention arise from the following description, in which an exemplary embodiment of the invention with reference to the drawing is described in detail. Herein, the characteristics mentioned in the claims and in the description may be essential for the invention, either on their own or in any combination.

FIG. 1 shows the schematic, exploded view of an actuator designed according to the design principle of the invention.

DETAILED DESCRIPTION OF THE PREFERRED EMBODIMENT

FIG. 1 shows the schematic, exploded view of a possible variant of the actuator 1, designed according to the design principle of the invention. The actuator has a motor 2, which is particularly designed as a stepper motor, and an actuator component 3 which can be actuated by the motor 2. The actuator component 3 has a movable gear component 4, here a drive rod, with a first and a second limit stop component 5a, 5b. The limit stop component may be the stop element 5a or a ball head 5b arranged on the gear component 4. The actuator 1 has a limit stop element 6, with an inner reference plane 6a and an outer reference plane 6b, serving as limit stops for the limit stop components 5a, 5b of the gear component 4. In this variant of the actuator 1, a housing part, here the housing cover, of the actuator 1, represents the limit stop element 6. The motor 2 having the design of a stepper motor has preferably two stator windings which can be cyclically supplied with current by an electric driver. By this means a leaping rotating magnetic field is generated, which the rotor follows in steps. The rotating movement of the rotor 2b is transformed into a linear actuation movement of the drive rod 4. To maintain the function of a system, such as a headlamp, the motor 2 is referenced again with each starting of the system. To avoid for example a misadjustment of the headlamp during driving, as this would cause dazzling the oncoming traffic, the motor 2 of a headlamp leveling actuator is referenced again with each starting of the motor vehicle. This ensures the exact positioning of the actuator 1, or rather of the actuator component 3 in the headlamp and the required freedom from dazzlement of the traffic is ensured.

The actuator 1 in FIG. 1, preferably embodied as headlamp leveling actuator, can execute referencing, depending on the installation position in the headlamp, on the inner reference plane 6a of the limit stop element 6, by means of the ball head 5b, as well as on the outer reference plane 6b of the limit stop element, by means of the stop element 5a. Upon the start of the referencing process, the stepper motor 2 and therefore actuator component 3 drives hard into the respective limit stop element 6 with an excess number of steps. In FIG. 1, especially the stop element 5a radially arranged on the drive rod 4 serves as limit stop component for driving into the housing part 6, embodied as housing cover, of the actuator 1. This means that the drive rod 4 is lead through the housing cover 6 and that the stop element 5a on the drive rod 4 drives hard into the housing cover 6 upon execution of a given number of referencing steps. The inner limit stop plane 6a in the housing cover 6 does therefore represent the reference plane for all further actions of the motor 2, and particularly of the stepper motor. If a defined number of steps in the opposite direction is specified, the geometric position of the ball head 5b, respectively the position of the connected headlamp system, for example a light module, can be deduced by counting the steps.

The actuator 1 is coupled with the headlamp system, and particularly with the headlamp housing, by means of a bayonet interface 7. An o-ring being preloaded with approx. 200 Newton by the bayonet coupling process between the housing cover 6 and the bayonet interface 7, or rather the bayonet reception of the bayonet interface 7, serves as safety device.

The limit stop element, i.e. the housing part respectively the housing cover 6, as well as the ball head 5b, but also the bayonet interface 7 of the actuator 1, are made from a high-temperature plastic material. The high-temperature plastic material features a high resistance to high application temperatures. Components of the actuator 1 made from a high-temperature plastic material are highly dimensionally stable to heat, rigid and stable and are characterized by a good resistance to chemicals. The major advantage of the use of a high-temperature plastic material for the manufacture of an actuator 1, respectively the components of the actuator 1, is that these parts can be made very easily in a molding process and particularly in an injection molding process, and can be reproduced very easily. The major advantage of the use of a high-temperature plastic material for the manufacture of an actuator 1, respectively the components of the actuator 1, is that/they it can be industrialized, and in particular manufactured in high volumes and at relatively low cost.

Such an actuator 1 is characterized in particular by the low coefficient of thermal expansion and the great material hardness of the high-temperature plastic material. This means that the low coefficient of thermal expansion and the great material hardness of the housing part 6, the ball head 5b, the stop element 5a and the bayonet interface 7 ensure that the position of the inner and the outer reference plane 6a, 6b of the housing part 6 serving as limit stop remains stable even when exposed to high temperatures for long periods of time and that the reference planes 6a, 6b do not undergo plastic deformation at high temperatures because of the hard reference limit stop. A bayonet interface 7 made from high-temperature plastic material remains stable even with high temperature, the bayonet hooks 7a of the bayonet interface deform only slightly. Furthermore, such an actuator ensures that the ball head 5b as coupling element to the headlamp module, for example to the light module, only has a slight influence on the temperature-dependent position of the cut-off line of the headlamp module. The strategic use of high-temperature plastic materials for the components of the actuators, and particularly of the headlamp actuators, thermally stabilizes the actuator and minimizes the influence of temperature on the cut-off line.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. An actuator comprising:
   a motor;
   an actuator component operable by the motor having a movable gear component with a first and a second limit stop component as well as a limit stop element with an inner and an outer reference plane serving as a limit stop of the limit stop components of the gear component;
   at least one of the limit stop element and the first and the second limit stop component being made from a high temperature plastic material, and
   characterized in that the high-temperature plastic material of one of the limit stop element, the first and the second limit stop component, and the bayonet interface has a Young's modulus of 17500 N/mm2 min, a stress at break of 220 N/mm2 min., an elongation at break of 2 N/mm$^2$ min., an impact strength of at least 80 kJ/m2 min.

2. An actuator comprising:
   a motor;

an actuator component operable by the motor having a movable gear component with a first and a second limit stop component as well as a limit stop element with an inner and an outer reference plane serving as a limit stop of the limit stop components of the gear component;

at least one of the limit stop element and the first and the second limit stop component being made from a high temperature plastic material, and characterized in that the high-temperature plastic material of one of the limit stop element, the first and the second limit stop component, and the bayonet interface has a melting temperature of at least 325° C. and a longitudinal coefficient of elongation of less than 0.15 times 10-4/K at a temperature between 23° C. and 55° C. and a lateral coefficient of elongation of less than 0.4 times 10-4/K at a temperature between 23° C. and 55° C.

3. An actuator comprising:

a motor;

an actuator component operable by the motor having a movable gear component with a first and a second limit stop component as well as a limit stop element with an inner and an outer reference plane serving as a limit stop of the limit stop components of the gear component;

at least one of the limit stop element and the first and the second limit stop component being made from a high temperature plastic material, and characterized in that the high-temperature plastic material of one of the limit stop element, the first and the second limit stop component, and the bayonet interface is short-term deformation resistant at temperatures over 250° C. and long-term deformation resistant at temperatures over 150° C.

* * * * *